J. DOVE.
SCENIC APPARATUS.
APPLICATION FILED JAN. 8, 1912.

1,036,586.

Patented Aug. 27, 1912.

Witnesses:
Harry C. Helbig
R. Brockman.

Inventor
Julius Dove
By his Attorney
Max A. Ordmann

UNITED STATES PATENT OFFICE.

JULIUS DOVE, OF YONKERS, NEW YORK.

SCENIC APPARATUS.

1,036,586.  Specification of Letters Patent.  Patented Aug. 27, 1912.

Application filed January 8, 1912. Serial No. 669,918.

*To all whom it may concern:*

Be it known that I, JULIUS DOVE, a subject of the German Emperor, residing at Yonkers, in the county of Westchester and State of New York, have invented certain new and useful Improvements in Scenic Apparatus, of which the following is a specification.

The present invention relates to a scenic apparatus for vaudeville acts and has for its object to provide an apparatus representing a foldable hand fan, on the unfolding of which living figures may be seen as if appearing on the surface of the fan.

My invention is illustrated in the accompanying drawing, in which—

Figure 1:
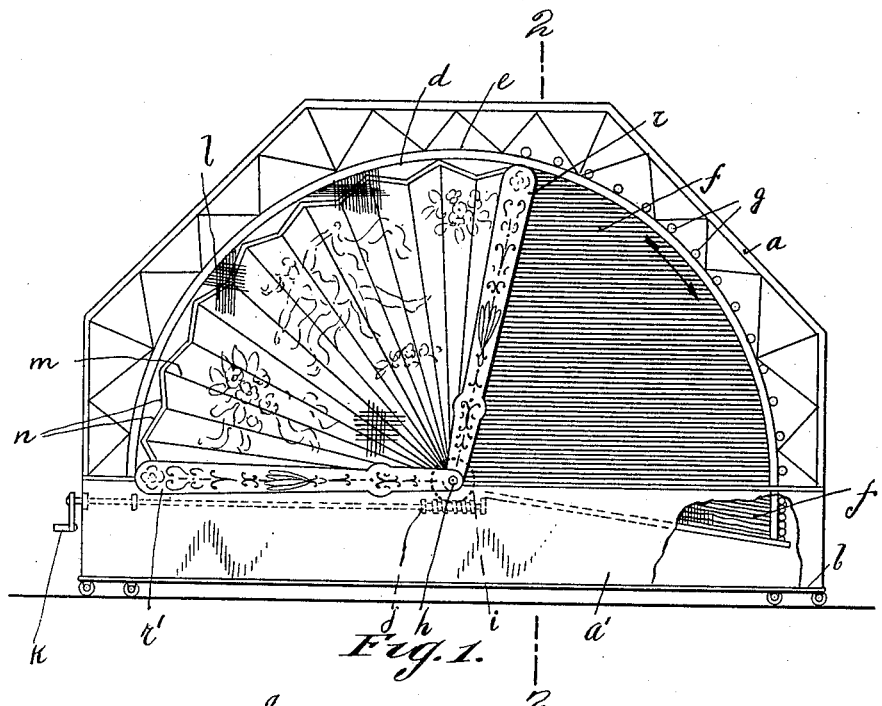
Figure 2:
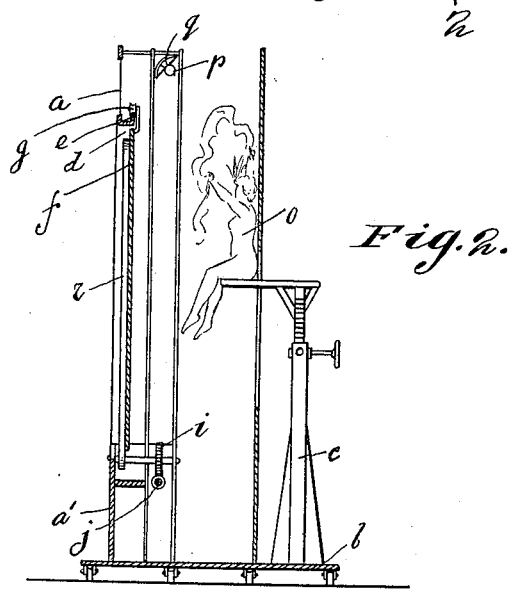

Figure 1 is a front elevation of the apparatus and Fig. 2 is a vertical section on line 2—2 of Fig. 1.

The device consists of a suitably shaped frame $a$ constructed on a wheeled platform $b$ and adjustable supports $c$ for living bodies. The frame is provided with a semicircular opening $d$, and a semi-circular guide $e$. This opening normally is covered by a semi-circular curtain $f$, of black velvet, or other suitable material, to the peripheral edge of which a number of wheels or rolls $g$ are secured adapted to roll on the guide edge $e$. This curtain has one of its lateral edges secured to a rigid arm $r$ and is capable of folding below the lower front part $a'$ of the frame. The arm $r$ together with an arm $r'$ fixed to the frame or painted thereon are shaped and ornamented to represent the rigid strips of a hand fan. The lever $r$ is fulcrumed at $h$ and may be swung by hand or by gears $i$, $j$ and a crank $k$.

Arranged at the rear of the curtain $f$ a screen $l$, preferably of fine gauze, is fixed to the frame and stretched over the entire opening $d$. On this gauze screen the folds or plaits $m$ and the zigzag edge $n$ are painted, to make the impression as if it actually forms the foldable surface of a fan. This screen permits of living figures $o$ supported at the rear of it being visible therethrough, as the non-transparent curtain $f$ is gradually folded together by swinging the arm $r$ to the right as indicated by the arrow. At the top of the frame behind said screen illuminating devices $p$ with suitable reflectors $q$ are provided.

What I claim and desire to secure by Letters Patent is:

1. A scenic apparatus comprising a wheeled frame having a semi-circular opening, a foldable non-transparent curtain, a swinging arm to which one side of said curtain is attached and a transparent screen at the rear of the curtain fixed to the frame and stretched over the entire opening, said screen being made to represent the surface of a foldable hand fan.

2. A scenic apparatus comprising a wheeled frame having a semi-circular opening, a foldable non-transparent curtain, a swinging arm to which one side of said curtain is attached, a transparent screen at the rear of the curtain fixed to the frame and stretched over the entire opening and supports at the rear of said screen for living bodies, said screen being made to represent the surface of a foldable hand fan.

3. A scenic apparatus comprising a wheeled frame having a semi-circular opening, a foldable non-transparent curtain, a swinging arm to which one side of said curtain is attached, a transparent screen at the rear of the curtain, fixed to the frame and stretched over the entire opening, said screen being made to represent the surface of a foldable hand fan, supports at the rear of said screen for living bodies and illuminating devices at the rear of the said screen secured to the said frame.

In testimony whereof I affix my signature in presence of two witnesses.

JULIUS DOVE.

Witnesses:
 JOHN T. CARMODY,
 MAX D. ORDMANN.

---

Copies of this patent may be obtained for five cents each, by addressing the "Commissioner of Patents, Washington, D. C."